United States Patent
Rutland et al.

(10) Patent No.: US 12,319,359 B1
(45) Date of Patent: Jun. 3, 2025

(54) PIVOTABLE AND NESTABLE CARGO RACK FOR TRUCK BED OR TRAILER

(71) Applicants: Bernice M. Rutland, Lula, MS (US); Robert A. Reyna, Lexa, AR (US)

(72) Inventors: Bernice M. Rutland, Lula, MS (US); Robert A. Reyna, Lexa, AR (US)

( * ) Notice: Subject to any disclaimer, the term of this patent is extended or adjusted under 35 U.S.C. 154(b) by 444 days.

(21) Appl. No.: 17/701,867

(22) Filed: Mar. 23, 2022

Related U.S. Application Data

(60) Provisional application No. 63/165,258, filed on Mar. 24, 2021.

(51) Int. Cl.
*B62D 33/027* (2006.01)
*B60R 9/06* (2006.01)
*B62D 33/02* (2006.01)

(52) U.S. Cl.
CPC ............ *B62D 33/0207* (2013.01); *B60R 9/06* (2013.01)

(58) Field of Classification Search
CPC ........ B62D 33/027; B62D 9/045; B60R 9/06; B60P 3/40; B60P 7/15
USPC ............ 296/3; 211/1.54, 100, 101, 204, 206
See application file for complete search history.

(56) References Cited

U.S. PATENT DOCUMENTS

| | | | |
|---|---|---|---|
| 4,138,046 A * | 2/1979 | De Freze | B60R 9/00 224/543 |
| 4,932,703 A * | 6/1990 | Chamberlin | B60R 9/06 224/403 |
| 5,431,472 A * | 7/1995 | Coffland | B60R 9/00 296/10 |
| 5,836,635 A * | 11/1998 | Dorman | B60R 9/00 296/3 |
| 6,598,922 B2 * | 7/2003 | Morse | B60P 3/40 296/26.02 |
| 6,634,689 B1 | 10/2003 | Soto | |
| 8,113,563 B1 * | 2/2012 | McCann | B60P 3/40 296/3 |
| 8,777,288 B2 | 7/2014 | Johnasen | |
| 10,479,416 B1 * | 11/2019 | Martin | B60R 3/02 |
| 10,562,461 B2 * | 2/2020 | Pacella | B60R 9/045 |
| 11,072,376 B2 * | 7/2021 | Condon | B62D 33/0207 |
| 11,230,326 B2 * | 1/2022 | Elder | B62D 33/0222 |

(Continued)

FOREIGN PATENT DOCUMENTS

GB 2436819 A * 10/2007 ................ B60P 7/15

OTHER PUBLICATIONS

K2 Flipping Truck Rack, depicted on web page at url https://realtruck.com/p/k2-flipping-truck-rack/ (accessed on Feb. 3, 2021).

(Continued)

*Primary Examiner* — Jason S Morrow

(57) ABSTRACT

A rack for a cargo area of a truck or trailer is pivotable and nestable. When pivoted to an erected position, the rack may be used to secure cargo in the truck bed or trailer, particularly with respect to cargo items that are large or top-heavy. The rack may then be pivoted to a lowered position when not in use, so that the truck bed or trailer may be easily used for other conventional purposes. The rack may pivot around a pivot bolt or pin, and be locked into the erected position with a locking bolt or pin. When in the lowered position, the rack may be sized and shaped to nest snugly within a perimeter of the truck bed or trailer such as not to interfere with other uses of the truck bed or trailer.

16 Claims, 8 Drawing Sheets

(56) References Cited

U.S. PATENT DOCUMENTS

| | | | | |
|---|---|---|---|---|
| 11,440,459 B1* | 9/2022 | Nunn | ................. | B60R 9/06 |
| 2004/0134953 A1* | 7/2004 | Perez | ................. | B60P 3/40 |
| | | | | 224/403 |
| 2015/0258940 A1* | 9/2015 | Breeden, III | .......... | B60R 9/045 |
| | | | | 224/405 |
| 2017/0036612 A1* | 2/2017 | Johnson | ............ | B60R 9/0485 |
| 2020/0398906 A1* | 12/2020 | Binley | ............ | B60R 9/08 |
| 2020/0406828 A1* | 12/2020 | Simonin | ............ | B60P 7/0807 |
| 2021/0347306 A1* | 11/2021 | Walk | ............ | B60R 7/046 |
| 2023/0173990 A1* | 6/2023 | Ni | ............ | B60P 7/15 |
| | | | | 224/403 |
| 2024/0001999 A1* | 1/2024 | Cunningham | ............ | B60R 9/06 |

OTHER PUBLICATIONS

Dee Zee DZ951800 Invis-A-Rack Cargo Management System, depicted on web page at url https://www.amazon.com/Dee-Zee-DZ951800-Invis-Management/dp/B00BCT2L32 (accessed on Feb. 3, 2021).

* cited by examiner

PIVOTABLE AND NESTABLE CARGO RACK FOR TRUCK BED OR TRAILER

BACKGROUND OF THE INVENTION

An estimated 31 million Americans move every year, resulting in a multi-billion-dollar American moving industry that includes an estimated 50,000 moving trucks. The average cost for an interstate move is estimated at $4,100, the average cost for an in-state move is estimated at $980, and the average hourly rate for each local mover estimated at about $25 per hour. Given these estimates, it's no wonder that for many households the costs of hiring professional help for moves (whether large moves or small moves) is financially burdensome. In addition, many movers would rather do the heavy-lifting themselves instead of paying professional movers. In fact, one study from 2019 found that only 19% of Americans used professional movers. The study found that of the remaining 81%, about 34% rented a truck to assist in their move, while the plurality of Americans, 47%, move themselves unassisted using their own vehicles and equipment.

Unassisted moving can be a challenge for many movers, particularly those with large items (such as furniture or appliances), which require careful attention when packing and moving using traditional trucks and trailers. An error in packing may cause furniture to fall or otherwise move during transport. This is particularly challenging for large, tall, top-heavy items, such as some appliances. While using an enclosed moving truck allows standing furniture or appliances to be moved more carefully, such a truck is a luxury many movers cannot afford. Instead, many movers must maneuver the challenges of moving large items using only a standard truck bed or standard flatbed trailer. This is particularly true for small moves, such as the purchase of a new furniture piece, where the cost of renting a full moving truck would not be realistic.

Having experienced the difficulties of moving large furniture pieces and having seen the mishaps of other movers, the inventors hereof have recognized the need for a novel cargo rack solution allowing everyday trucks or trailers to be utilized as effective moving equipment, while otherwise maintaining their general everyday nature when not used for moving large pieces.

BRIEF SUMMARY OF THE INVENTION

The present invention is generally directed to a pivotable and nestable cargo rack for a truck bed or trailer useful for selectively manipulating the truck bed or trailer from its state of everyday use to an in-move state. In certain embodiments, the invention allows the user of a truck or trailer that would otherwise be in its standard, everyday use state to easily erect the cargo rack in the truck bed or trailer to allow for the more secure movement of larger cargo in the truck bed or trailer, particularly items that are large, tall, and top-heavy. The cargo rack is provided such that the user can easily secure the larger cargo to the erected cargo rack using straps or other securing means, allowing for the more secure transport of the large cargo.

The cargo rack according to certain embodiments is both useful for preventing the cargo from tipping over during transit and for preventing the cargo from sliding back and forth within the truck or trailer. Sliding during transit may cause the load to become unbalanced such that the trailer becomes harder to control, presenting a safety hazard. After the transport of the larger cargo is complete, the user can easily pivot the cargo rack back to its stowed position, which is preferably nested within the normal perimeter of the truck bed or trailer, effectively hiding the cargo rack and placing the truck bed or trailer back into its state of everyday use until the need for the cargo rack arises again in the future.

These and other objects, features, and advantages of the present invention will become better understood from a consideration of the following detailed description of the preferred embodiments and appended claims in conjunction with the drawings as described following:

DETAILED DESCRIPTION OF THE INVENTION

Figure 1:
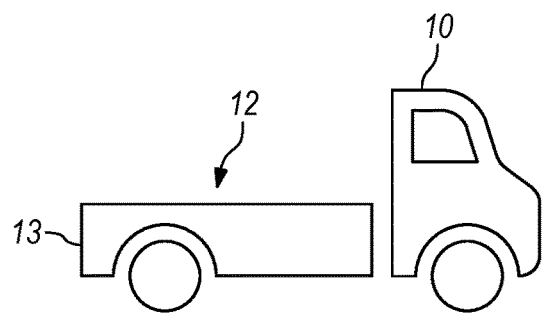
FIG. 1 is a schematic diagram in elevation of a typical vehicle used in cargo transport.

Generally speaking, the present invention is directed to a pivotable and nestable cargo rack for a truck bed or trailer useful for selectively manipulating the truck bed or trailer from its state of everyday use to an in-move state. The invention allows the user of a truck or trailer that would otherwise be in its standard, everyday use state to easily erect the cargo rack in the truck bed or trailer to allow for the more secure movement of larger cargo in the truck bed or trailer.

While the invention is particularly useful in connection with a truck bed or flatbed trailer, for purposes of describing the invention, it may be said that the invention is used with the "cargo area" of a "vehicle", where the term "vehicle" refers to any automobile or equipment that is used for transport of goods or cargo (such as a truck, trailer, or other similar equipment) and the term "cargo area" refers to the portion of that vehicle that is primarily used for the storage and/or transport of cargo (such as the bed of a truck, the bed of a trailer, or other similar cargo storage area). Thus, with reference to the specific embodiment of a truck bed, it may be seen that the truck itself is the "vehicle" and the bed of the truck is the "cargo area" and for a flatbed trailer it may be seen that the trailer is the "vehicle" and the bed itself is the "cargo area." Further, while the present invention is particularly suitable for the storage and transport of furniture, appliances, or other large equipment, for purposes of describing the invention the term "cargo" may be used to refer to the furniture, appliance, or other equipment or item being transported.

In certain embodiments described herein, the cargo rack according to the present invention includes the following components: (a) a frame that embodies the cargo rack structure and provides a secure structure for attachment to the cargo when in transport, (b) a means for pivoting the cargo rack structure between the stowed position and the upright position, (c) a means for nesting the cargo rack structure when in the stowed position, and (d) structural additions to the frame that provide various cargo support features during transport of the cargo. Each of these components is described more fully below.

As noted above, the term "cargo area" refers to the storage/transport area of a vehicle where cargo is positioned during transport. The most notable and recognizable forms of cargo areas in connection with which the present invention may be of particular usefulness is in the form of a truck bed or flatbed trailer. FIGS. 1-5 depict a truck 10 with bed or cargo area 12, while FIGS. 6 and 9-12 depict cargo area 12 as being part of a trailer. Similar beds or cargo areas may be seen in various other sorts of trucks, trailers, and transport vehicles. In many instances, the cargo area 12 of these vehicles includes side railing or structure 13 that provides a depth to the cargo area, such that there is a flat bottom in the cargo area and side structure 13 providing the depth of the cargo area 12. This side structure 13 is generally useful for, among other things, providing a perimeter of the cargo area 12 to prohibit cargo from unintentionally falling from the cargo area 12 during transport. However, in many vehicles used as everyday drivers that are also used to transport cargo, the side structure 13 is typically kept rather short. This allows the driver of the vehicle to see surrounding vehicles and structures more clearly during vehicle use. And while these shorter side structures 13 may be effective at keeping smaller cargo secured in the cargo area 12, they are not as effective at keeping larger cargo secure. For example, a large piece of furniture or other cargo 16 that extends to a height beyond that of the side structure 13 of the cargo area 12 may be at risk for falling or tipping (even in cases were straps are used to secure the cargo 16 as best as it can be secured). This scenario is shown, for example, in FIG. 4, where cargo 16 extends far above side structure 13 of cargo area 12 on truck 10.

Figure 3:
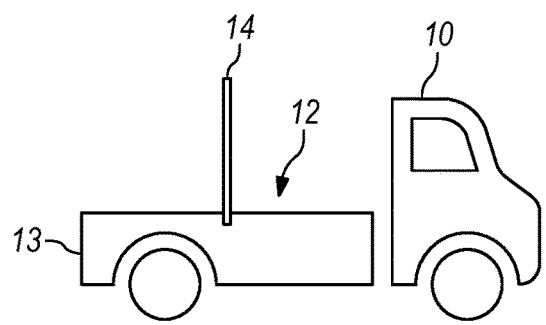
FIG. 3 is a schematic diagram in elevation showing one embodiment of the frame of the present invention in the upright position.
Figure 4:
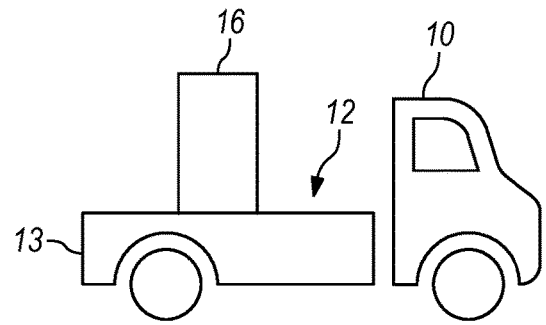
FIG. 4 is a schematic diagram in elevation showing a typical vehicle used for transport of large cargo.
Figure 5:
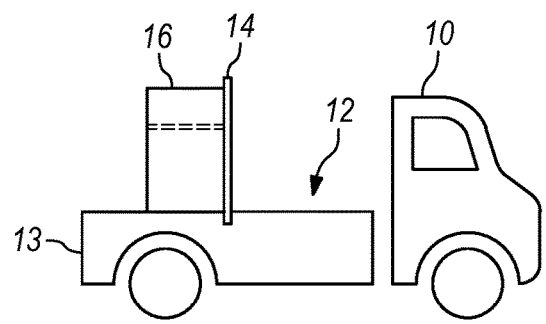
FIG. 5 is a schematic diagram in elevation showing one embodiment of the present invention in the upright position with large cargo secured to the frame of the present invention.

As noted above the present invention includes a frame 14 that embodies the cargo rack structure utilized for the secure transport of cargo using the vehicle. This frame is shown in simplified form in FIGS. 2, 3, and 5. The frame 14 is particularly useful for storing larger cargo 16 that would otherwise be unsecure when transported with a vehicle 10 with standard side structures 13 (compare, for example, FIG. 5 showing the use of the frame 14 to secure a larger cargo 16 with FIG. 4 showing no structure for securing the larger cargo 16 in a cargo area 12 of a truck 10). While the frame 14 can take any number of shapes, because it is understood that the present invention is particularly useful where the cargo 16 is transported using a truck bed 12 or flatbed trailer, which both have generally rectangular shapes, and because the frame 14 is intended to be stowed/nested inside the general perimeter of the cargo area 12 (as shown, for example, in FIG. 2 and described more fully below), it may be seen that in the illustrated embodiment the frame 14 is also of generally rectangular shape. Of course, other shapes may be utilized depending on the shape of the cargo area 12 in which the any particular embodiment of the invention is intended to be utilized. In any event, no matter the shape or size of the frame 14, the frame 14 is positioned in and pivotably attached to the cargo area 12 of the vehicle 10 used for transport via a means for pivoting.

In the illustrated embodiment, as noted, the frame 14 is generally rectangular in structure. It preferably includes only three major components/sides to create the generally rectangular shape, however, without a fourth side/component to complete a four-sided shape. This feature of the illustrated embodiment is shown most clearly in FIGS. 6 and 7. The frame 14 is positioned such that the side arms 18 extend vertically from the cargo area and act as uprights when the cargo rack is in the upright, erected position for transport of the cargo 16 (as illustrated in FIGS. 3 and 5) and the crossbar or end component 20 acts as a top crossbeam connecting the two uprights (FIG. 7) by connecting the side arms 18 at a distal end of the side arms 18. When in the stowed position, these components of the frame preferably nest easily within the perimeter of the cargo area 12, as described more fully below. Side arms 18 pivot from an erected position to a stowed position, as explained herein, but nevertheless remain in a plane that is parallel to the longitudinal direction of the truck or trailer. In other words, if an x axis were defined at the centerline of the truck or trailer, and a y axis pointing to either side of the truck or trailer perpendicular to the x axis, and a z axis pointing through the truck or trailer upward and downward and perpendicular to both the x and y axes, then the side arms 18 pivot in a plane parallel to the x-z plane, but do not move in the x-y plane. Crossarm 20 extends in a direction parallel to the y axis.

In an alternative embodiment, the side arms 18 of the frame (which act as the vertical arms when the frame is in the upright position) may be telescoping in nature, thereby allowing the length/height of the side components to be selectively modified. In such embodiments, a spring-loaded side arm locking pin may be used to lock the side arms 18 at the desired length/height as appropriate. This alternative embodiment may be employed, for example, in longer trailers where it would be desirable to lower the height of the frame below what would otherwise result if the full height is measured as the height necessary in order for frame 14 to fit snugly within the perimeter of cargo area 12.

The frame components as side arms 18 and end component 20 are preferably made of a strong, durable material (such as iron or aluminum) in order to provide a durable structure to which the cargo can be secured during transport. In one example, these components may be formed of square 2" tubing, or round tubing, or square or round tubing of other sizes. For additional strength, optional corner supports 22 may be included to brace between side arms 18 and end component 20. These corner supports 22 may be formed of angle iron or solid metal plate, for example.

Figure 2:
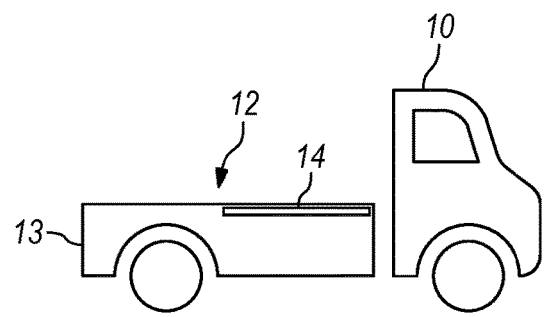
FIG. 2 is a schematic diagram in elevation showing one embodiment of the frame of the present invention in the stowed position.
Figure 6:
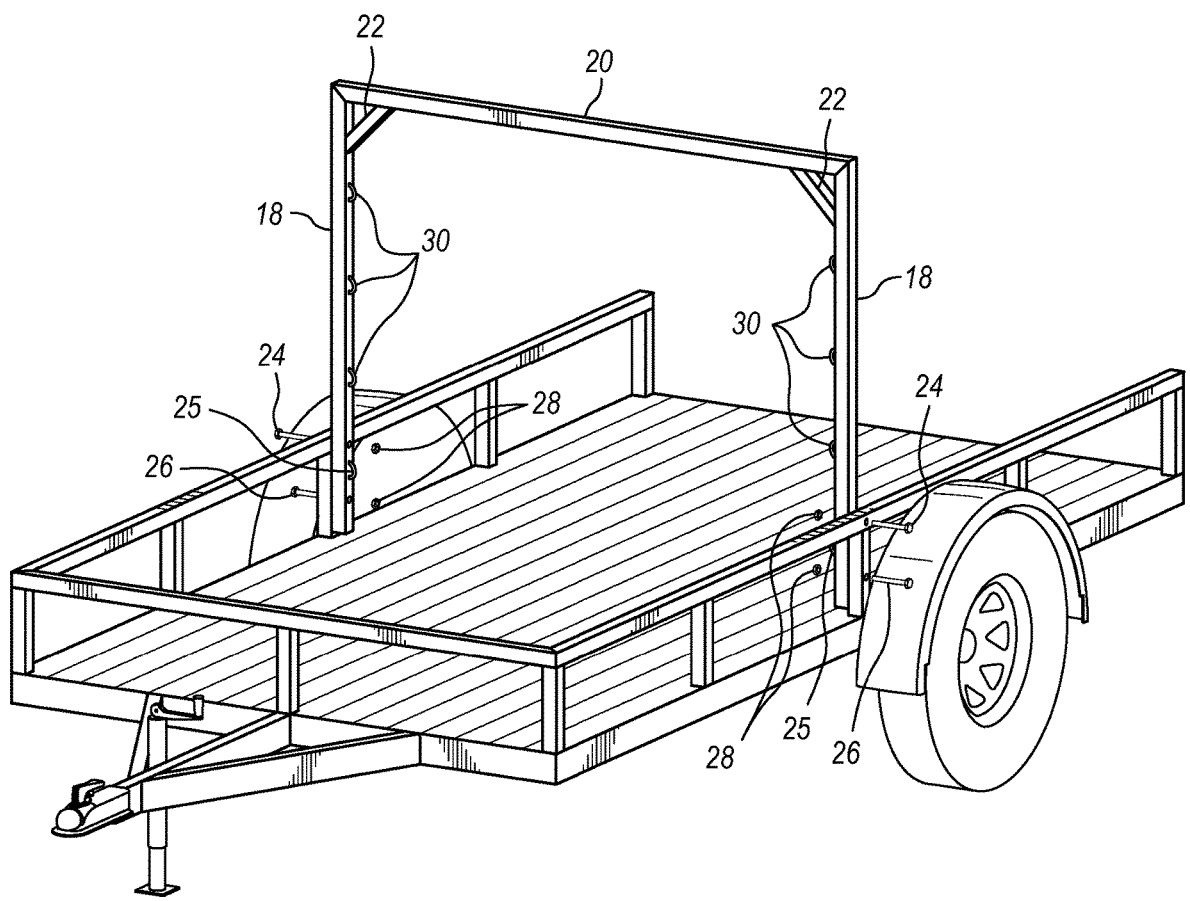
FIG. 6 is a perspective view looking rearwardly showing one embodiment of the present invention.

To move the frame (side arms 18 and end component 20) from the stowed position (as shown in FIG. 2) to the raised position (as shown in FIG. 4), the frame pivots with respect to cargo area 12. In the illustrated embodiment, the side arms 18 of the frame, which as noted above act as the uprights when the frame is in the erected position, are pivotably connected to the cargo area 12. In one embodiment, as shown in FIG. 6 for example, the side arms 18 are pivotably connected to the side railing 13 of the cargo area using pivot bolts 24. This pivotable connection is shown in more detail in FIG. 8. side arms 18 are allowed to pivot around pivot bolts 24, allowing the frame to be moved to a vertical, erected position, or a lowered, flat position in cargo area 12 within the perimeter of side structure 13. Pivot bolts 24 maintain side arms 18 in position with respect to cargo area 12, while allowing this pivoting movement to raise or lower frame 14. Pivot bolts 24 may optionally be held in position passing through side arms 18 and side structure 13 by pivot bolt nuts 25.

Figure 8:
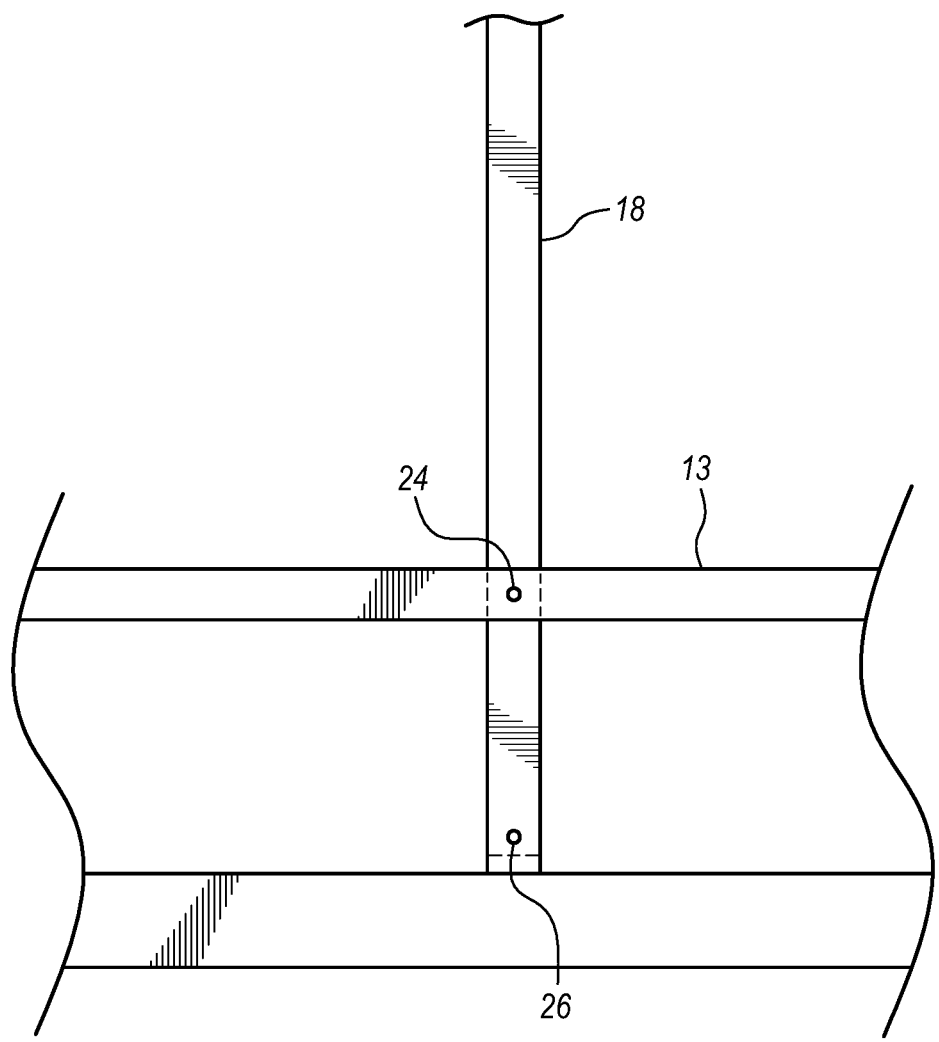
FIG. 8 is a detail elevational view showing pivot means of the present invention.
Figure 9:
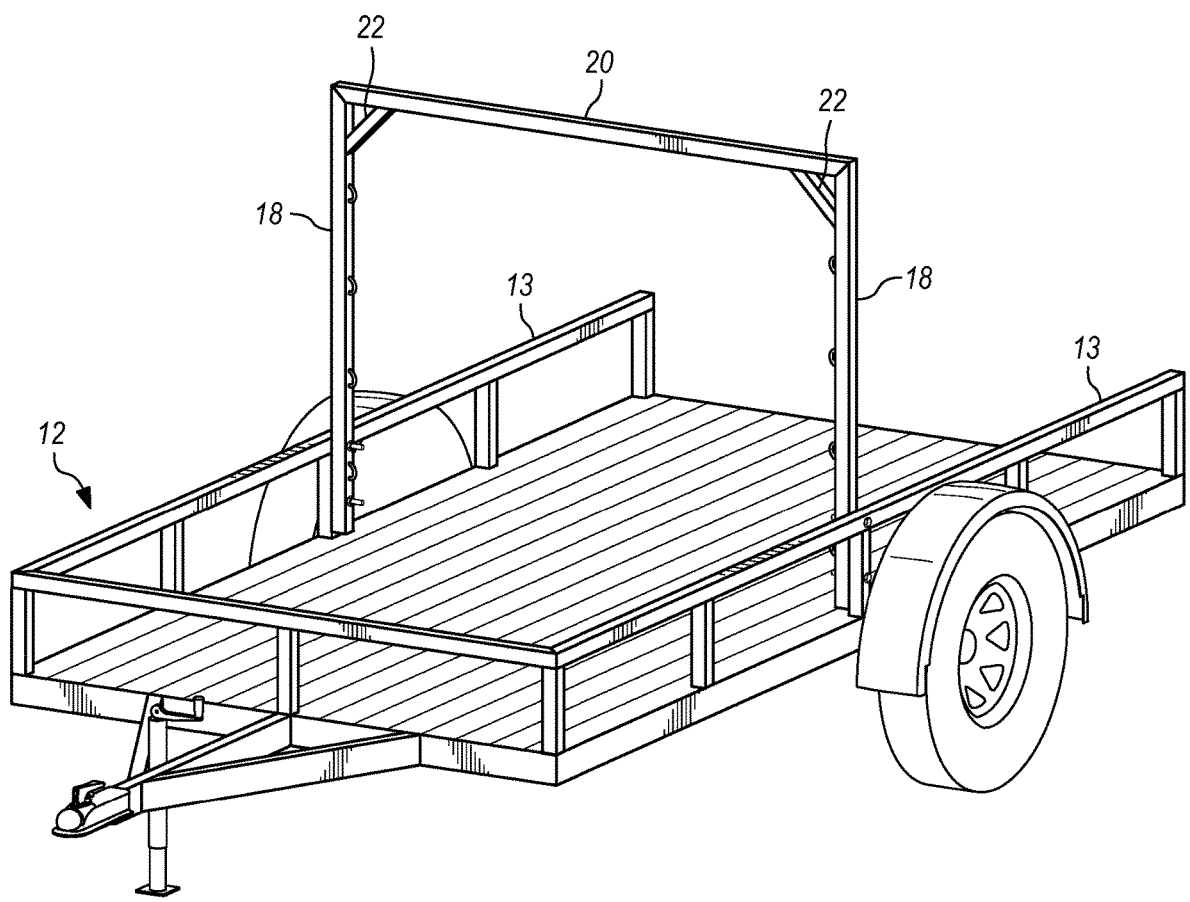
FIG. 9 is a perspective view showing one embodiment of the present invention fitted to a trailer with the frame raised.

Frame 14 will rest securely in position when lowered into cargo area 12 without further need to be secured, due to its weight and the fact that it is captured within the perimeter of side structure 13. When in the erected position, however, frame 14 is held in place by the use of fastening bolts or pins 26, which are optionally secured with fastening bolt nuts 28. Each of the side arms 18 of the frame 14 preferably includes an aperture for receiving a fastening bolt or pin 26. The fastening bolts 26 are operable to rigidly attach the side arms 18 of the frame 14 to the side structure (e.g. railing) 13 of the cargo area 12, as shown in FIG. 8. The fastening bolts or pins 26 are removable from the aperture so that the frame 14 can be allowed to pivot about the pivot bolts 24. The fastening bolts or pins 26 may then be inserted into the corresponding apertures in side arms 18 to lock the frame 14 from pivoting, which will be necessary when the frame 14 is erected and used for transport, as the frame must be secured from movement during such use. The fastening bolts or pins 26 may, in one embodiment, be spring-loaded pins for ease of use.

As noted, when the frame 14 of the illustrated embodiment of the present invention is in the upright, erected position, it extends vertically from the cargo area as shown in FIGS. 3 and 5. On the other hand, when the frame 14 is in the stowed position, as shown in FIG. 2, for example, the frame 14 is nestable within the perimeter of the cargo area 12. Thus, it may be seen that in the illustrated embodiment, the nesting means of the present invention is the generally matching shape of the frame 14 and the perimeter of the cargo area 12. This allows the frame 14 to nest into the perimeter of the cargo area 12 almost as if the frame 14 disappears entirely within the cargo area 12. In one example, side arms 18 may be of appropriate length that top component 20 lays flush against a front of bed 12, perhaps against a front interior edge of side structure 13. This nesting allows the frame 14 to be selectively stowed in a nonobtrusive manner to allow the vehicle 10 to resume its everyday use with its cargo area 12 in its near standard shape and profile.

Figure 10:
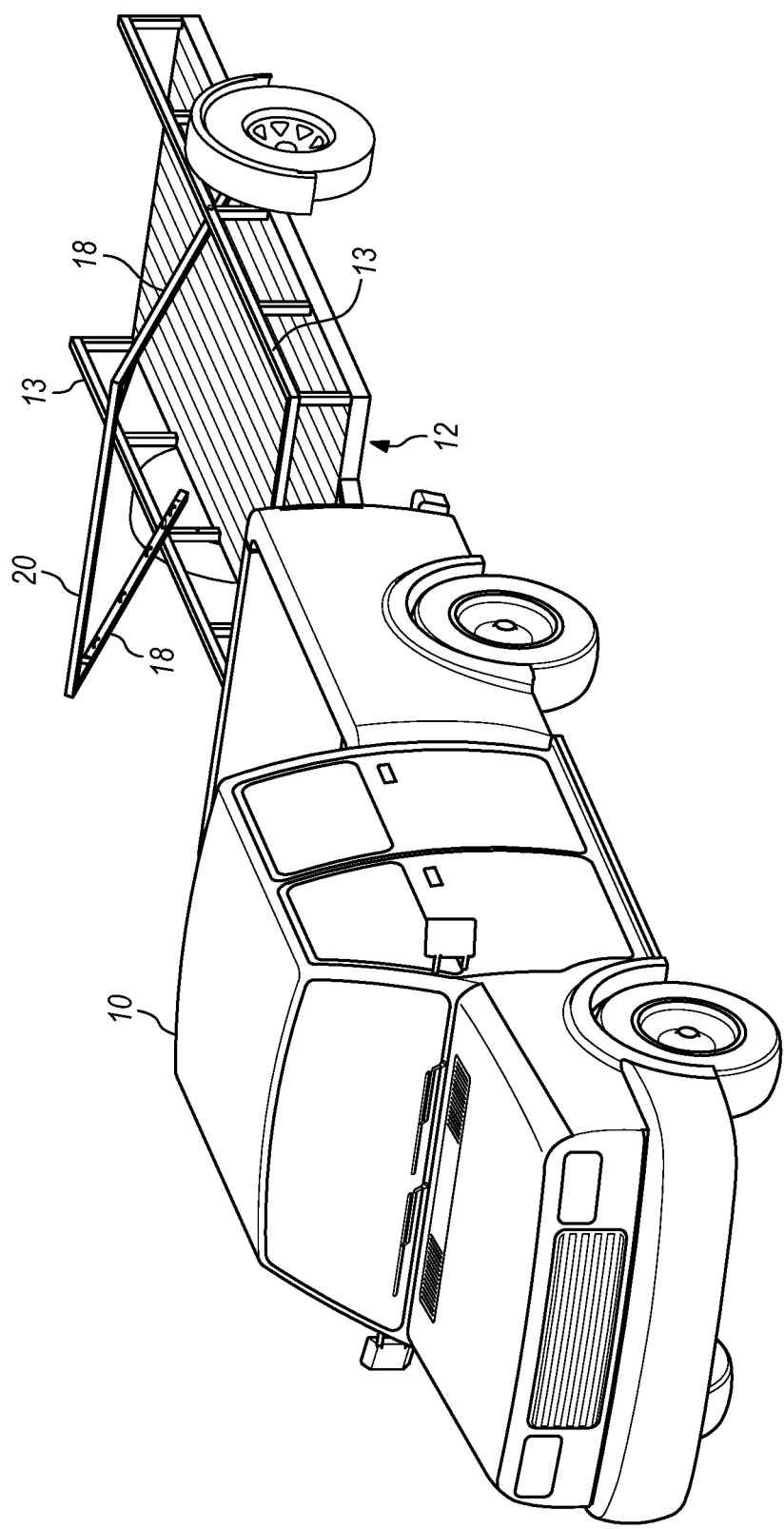
FIG. 10 is a perspective view showing the embodiment of the present invention from FIG. 9 with a truck pulling the trailer and with the frame partially lowered.
Figure 11:
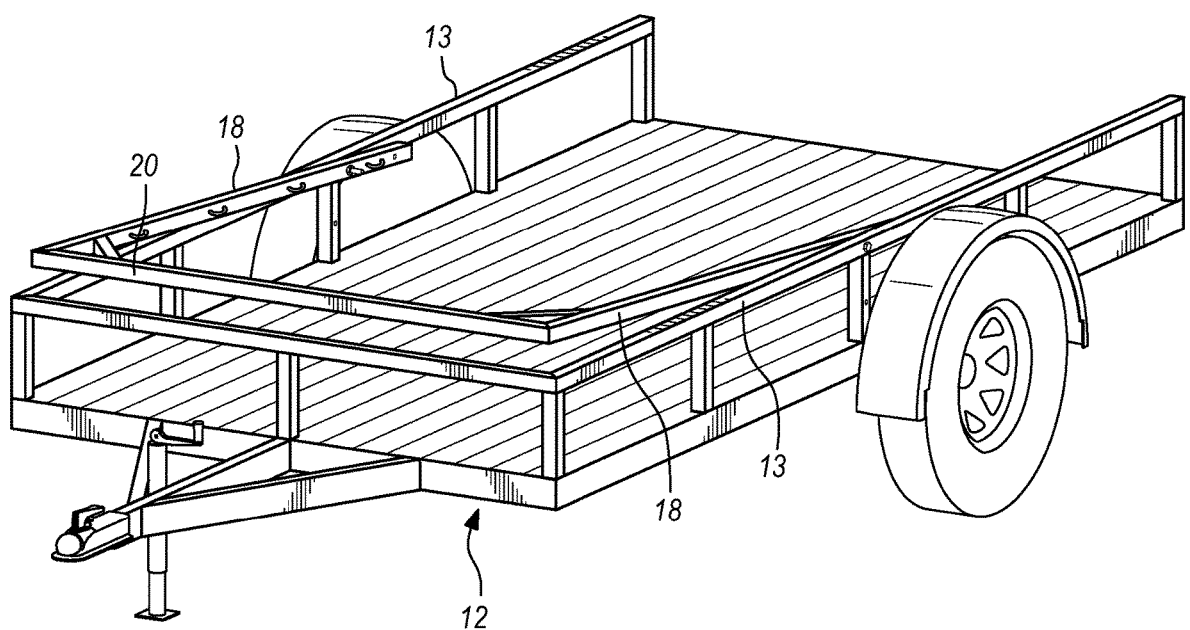
FIG. 11 is a perspective view showing the embodiment of the present invention from FIGS. 9 and 10 with the frame further lowered from the position of FIG. 10.
Figure 12:
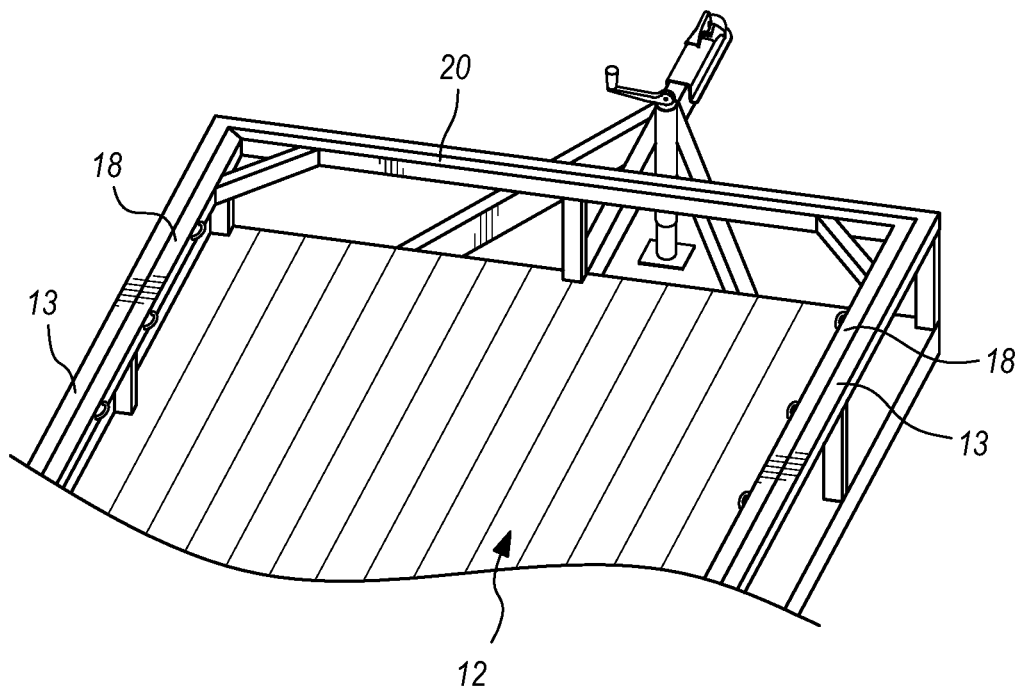
FIG. 12 is a perspective view showing the embodiment of the present invention from FIGS. 9-11 with the frame fully lowered.
Figure 13:
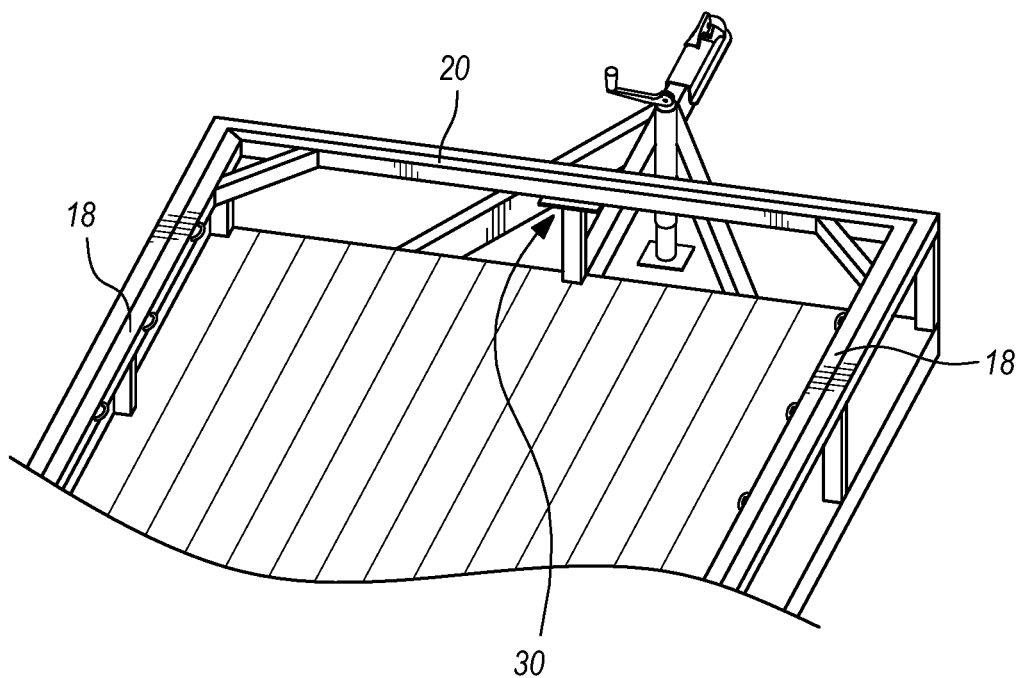
FIG. 13 is a perspective view showing an alternative embodiment of the present invention with a frame brace and the frame fully lowered to engage with the frame brace.

FIGS. 9-13 show an alternative embodiment in which frame 14 is fitted to a trailer to be pulled behind vehicle 10 rather than to the bed of vehicle 10. In this embodiment, frame 14 in the stowed position folds toward the front of eh trailer rather than toward the front of the bed of vehicle 10. FIGS. 10 and 11 show frame 14 in a partially lowered and further lowered position, respectively. FIGS. 12 and 13 show frame 14 fully lowered, with end component 20 fitted against the front of the cargo area 12 of the trailer. In FIG. 13 the optional securing bracket 30 is used, as described following.

In the embodiment as shown in FIG. 13, the cargo area 12 may further include a securing bracket or multiple securing brackets 30 (which may be crafted from a piece of angle iron or other durable material) secured to the inner perimeter of the cargo area 12. The securing bracket(s) 30 may be configured to receive the frame 14 when the frame 14 is in the stowed position such that the securing bracket(s) 30 hold the frame 14 in the stowed position. In the embodiment used in a bed of vehicle 10, this allows vehicle 10 to be used as an everyday work vehicle or driver without interference from frame 14. Alternatively, when frame 14 is fitted to a trailer as cargo area 12, then this allows the trailer to be used in a normal fashion without employing frame 14. This is thus an alternative to simply allowing the frame 14 to rest within cargo area 12 without being secured. It may be seen that there may be a single securing bracket 30 or multiple securing brackets 30. In the case of a single securing bracket 30, the bracket can be placed on any position along the inner perimeter of the cargo area 12. Where two securing brackets 30 are used, for example, a securing bracket 30 can be positioned on the inner perimeter of the cargo area 12 on each of two opposing sides of the cargo area 12 (such as a left side of a bed or trailer and the right side of a bed or trailer). In one alternative embodiment, an additional securing bracket 30 can be positioned on the end of the cargo area 12. In one embodiment, the securing bracket(s) 30 can be secured to the frame 14 itself, where the securing bracket secures the frame 14 in the stowed position when the frame is pivoted down into the perimeter of the cargo area 12 to nest and stow.

Figure 7:
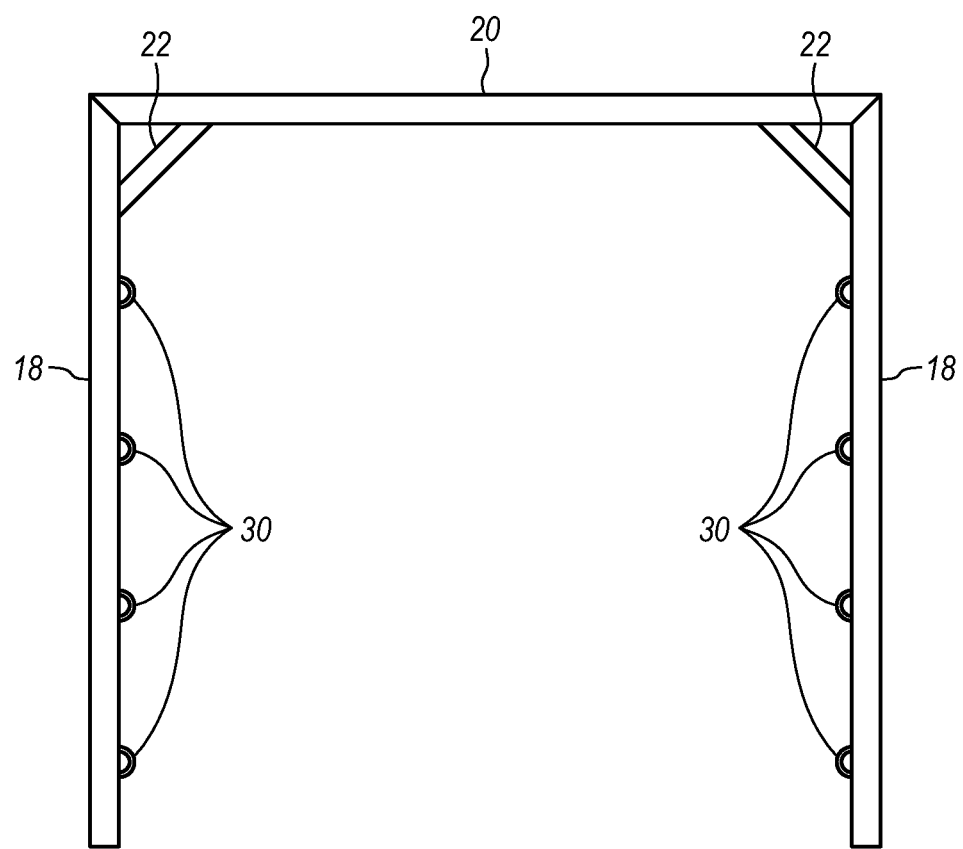
FIG. 7 is an elevational view of a frame showing one embodiment of the present invention with strap brackets.

In the illustrated embodiment, the present invention includes a number of strap brackets 30 positioned along the frame 14. For example, strap brackets 30 may be arranged along the interior of side supports 18 at intervals. These strap brackets 30 may provide means of securing the cargo 16 to the cargo rack frame 14, as shown in FIGS. 6 and 7, using straps, ropes, or other similar securing means.

Because the cargo is secured to the erected frame 14 during transport, the cargo 16 is both prevented from tipping over (which would prevent damage to the cargo 16) and is prevented from sliding back and forth within the cargo area 12. Sliding in the cargo area is particularly a concern in the case where a trailer is being used for transport of the cargo 16, since this could cause the load in the trailer to become unbalanced such that the tongue of the trailer becomes either too heavy or too light, ultimately making the trailer harder to control. This may result in a safety hazard for the driver or other drivers on the road. The frame 14 of the illustrated embodiment of the present invention is thus useful for keeping the cargo 16 in a substantially upright position and in the same or substantially the same position within the cargo area 12 while transport is taking place.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included. All references cited herein are hereby incorporated by reference to the extent that there is no inconsistency with the disclosure of this specification. When a range is stated herein, the range is intended to include all sub-ranges within the range, as well as all individual points within the range. When "about," "approximately," or like terms are used herein, they are intended to include amounts, measurements, or the like that do not depart significantly from the expressly stated amount, measurement, or the like, such that the stated purpose of the apparatus or process is not lost.

The present invention has been described with reference to certain preferred and alternative embodiments that are intended to be exemplary only and not limiting to the full scope of the present invention, as set forth in the appended claims.

We claim:

1. A cargo rack to secure a cargo in a trailer, the cargo rack comprising:
    a frame, wherein the frame comprises:
        a plurality of side supports, wherein the side supports are arranged in a plane parallel to a longitudinal direction of the trailer; and
        a crossarm connecting the plurality of side supports;
    wherein the frame is pivotally connected to the trailer at a fixed position with respect to the side supports so as to move from an erected position wherein the side supports extend upwardly from the trailer to a lowered position wherein the side supports extend within a perimeter of the trailer; and
    wherein each of the side supports comprise a side support length such that the frame, when in the lowered position, necessarily fits snugly within the perimeter of the trailer and against an interior side of the trailer without extending above an upper edge of the trailer and without extending beyond the perimeter of the trailer.

2. The cargo rack of claim 1, further comprising a pivot bolt pivotally connecting each of the plurality of side supports to the trailer at the fixed position with respect to the side supports.

3. The cargo rack of claim 2, further comprising a fastening bolt for each of the plurality of side supports, wherein each of the plurality of side supports comprises an aperture to removably receive the fastening bolt when the frame is in the erected position whereby the frame is locked in the erected position.

4. The cargo rack of claim 3, wherein the plurality of side supports comprise square tubing.

5. The cargo rack of claim 3, wherein the frame further comprises a plurality of corner supports, wherein each corner support connects between one of the plurality of side supports and the crossarm.

6. The cargo rack of claim 3, wherein the crossarm is straight such that the plurality of side supports and crossarm form three sides of a rectangle, wherein the rectangle is sized to fit snugly within the perimeter of the trailer.

7. The cargo rack of claim 3, wherein each of the plurality of side supports comprises at least one strap bracket positioned at an interior side of such side support.

8. A trailer, the trailer comprising:
    a flat bed comprising a perimeter;
    a side frame, the side frame comprising a left side frame attached at a left side of the flat bed and a right side frame attached at a right side of the flat bed;
    a pivoting frame pivotally attached to the left side frame and right side frame, wherein the pivoting frame comprises:
        a pivoting frame left side and a pivoting frame right side, wherein the pivoting frame left side is pivotally connected to the left side frame and the pivoting frame right side is pivotally connected to the right side frame; and
        a pivoting frame crossarm connecting the pivoting frame left side and pivoting frame right side;
    wherein the pivoting frame may pivot between an erected position
    wherein the pivoting frame left side and pivoting frame right side extend upwardly from the flat bed to a lowered position wherein the pivoting frame left side and pivoting frame right side necessarily extend within the perimeter of the flat bed; and
    wherein the pivoting frame left side and pivoting frame right side each of comprise a side length such that the pivoting frame, when in the lowered position, necessarily fits snugly within the perimeter of the flat bed and against an interior side of the side frame without extending above an upper edge of the side frame and without extending beyond the perimeter of the flat bed.

9. The vehicle of claim 8, further comprising a pivot bolt pivotally connecting each of the pivoting frame left side and pivoting frame right side to the side frame.

10. The vehicle of claim 9, further comprising a fastening bolt for each of the pivoting frame left side and pivoting frame right side, wherein each of the pivoting frame left side and pivoting frame right side comprises an aperture to removably receive the fastening bolt when the pivoting frame is in the erected position whereby the pivoting frame is locked in the erected position.

11. The vehicle of claim 10, wherein the pivoting frame further comprises a plurality of corner supports, wherein one of the plurality of corner supports connects between the pivoting frame left side frame and the pivoting frame crossarm, and another of the plurality of corner supports connects between the pivoting frame right side frame and the pivoting frame crossarm.

12. The vehicle of claim 10, wherein the pivoting frame crossarm is straight such that the pivoting frame left side, pivoting frame crossarm, and pivoting frame right side form three sides of a rectangle, wherein the rectangle is sized to fit snugly within the perimeter of the flat bed.

13. The vehicle of claim 10, wherein each of the pivoting frame left side and pivoting frame right side comprises at least one strap bracket positioned at an interior face of such pivoting frame left side and pivoting frame right side.

14. The vehicle of claim 10, further comprising at least one securing bracket attached to the side frame and positioned to engage with the pivoting frame when the pivoting frame is in a lowered position within the perimeter of the flat bed.

15. The vehicle of claim 14, wherein the at least one securing bracket is configured to hold the pivoting frame within the perimeter of the flat bed when the pivoting frame is in the lowered position.

16. The vehicle of claim 10, further comprising at least one securing bracket attached to the pivoting frame and positioned to engage the side frame when the pivoting frame is in a lowered position within the perimeter of the flat bed.

* * * * *